United States Patent
Brady et al.

(10) Patent No.: US 11,448,325 B1
(45) Date of Patent: Sep. 20, 2022

(54) WALL SILLCOCK

(71) Applicant: Prier Products, Inc., Grandview, MO (US)

(72) Inventors: Scott P. Brady, Lake Winnebago, MO (US); Sarah Schlager, Union City, TN (US); Joseph E. Poskin, Prairie Village, KS (US)

(73) Assignee: Prier Products, Inc., Grandview, MO (US)

( * ) Notice: Subject to any disclaimer, the term of this patent is extended or adjusted under 35 U.S.C. 154(b) by 0 days.

(21) Appl. No.: 17/199,269

(22) Filed: Mar. 11, 2021

(51) Int. Cl.
  *F16K 5/06* (2006.01)
  *E03B 9/02* (2006.01)
  *F16K 27/06* (2006.01)

(52) U.S. Cl.
  CPC ............ *F16K 5/0605* (2013.01); *E03B 9/025* (2013.01); *F16K 27/06* (2013.01)

(58) Field of Classification Search
  CPC . E03C 1/042; E03B 9/02; E03B 9/025; E03B 9/40; F16K 1/04; F16K 11/04; F16K 27/02; F16K 27/0263; F16K 27/0281; F16K 27/06; Y10T 137/86815; Y10T 137/86879; Y10T 137/87571; Y10T 137/87676; Y10T 137/87684
  See application file for complete search history.

(56) References Cited

U.S. PATENT DOCUMENTS

| | | | |
|---|---|---|---|
| 1,454,172 A | * | 5/1923 | Junkers ............... F16K 27/0263 137/599.12 |
| 2,762,387 A | | 9/1956 | Orwin |
| 5,152,503 A | | 10/1992 | Conway |
| 6,047,729 A | | 4/2000 | Hollister et al. |

FOREIGN PATENT DOCUMENTS

GB          2325042 A   * 11/1998   ............. F16K 27/06

* cited by examiner

*Primary Examiner* — Hailey K. Do
(74) *Attorney, Agent, or Firm* — Avek IP, LLC (57) ABSTRACT

A sillcock with one or more side inlets, which allow the sillcock to be mounted directly to a wall or other structure without additional fittings such as an elbow or tee. The sillcock may include an integral stop to allow the sillcock to be shut off and serviced without shutting off the entire system. Multiple inlets allow the sillcock to be used in a system of sillcocks coupled or ganged together in a water system.

34 Claims, 6 Drawing Sheets

… or a threaded plug (not shown). Although illustrated with pipe threads, inlets 14 and 16 may include any other type of joint such as straight threads, solder or push-fit, for example. Additionally, in a two-inlet configuration, the inlets 14 and 16 may be coaxial as shown in FIGS. 1-9, or they may be in a 90-degree configuration.

The integral stop 18 includes an elongated adjustable stem 28, a seat washer 30 secured to the stem 28 by a bibb screw 32 and a retaining nut 34. The elongated adjustable stem 28 includes external threads 29, and is received in the retaining nut 34 engaging internal threads 31, and sealed by O-ring 36. The retaining nut 34 has external threads 35 and is received in the valve body 12, engaging internal threads 37 and sealed by O-ring 38. Rotation of the adjustable stem 28 translates the stem 28 longitudinally within the nut 34, which allows the seat washer 30 to open or close the channel 40 from the inlets 14 and/or 16 to the valve shut-off 20. When the integral stop 18 is closed by rotating the stem 28 clockwise, the seat washer 30 is seated against an internal surface 42 of the valve body 12 blocking an aperture 44 and preventing water 45 from entering the channel 40. When the integral stop 18 is opened by rotating the stem 28 counterclockwise, the seat washer 30 is moved away from the internal surface 42, opening the aperture 44 and permitting water 45 to enter the channel 40 to the valve shut-off 20. (See FIGS. 4, 8 and 9).

Valve shut-off 20 may include a stem 46, a seat washer 48 secured to the stem 46 by a bibb screw 50, a stem packing 52 and washer 54, a valve stem cap 56 and an operator handle 58 secured to the end of the stem 46 opposite the seat washer 48 by a handle screw 60. The valve stem cap 56 includes internal threads 57, which engage external threads 59 of the valve body 12 to secure the valve shut-off 20 to the valve body 12. The outlet 22 may include a check spider 62, a washer 64 and a threaded hose bibb 66 secured to the valve body 12. The operator handle 58 is rotatable to longitudinally translate the stem 46 within the valve shut-off 20 to open and close the valve shut-off 20. It should be understood that operation of the valve shut-off 20 is not limited to an operator handle 58 as shown, and may include a loose key, lever, or other means to rotate the valve shut-off 20.

The valve body 12 includes a longitudinal axis 13 and a mounting plate or flange 68 for mounting the sillcock 10 to a wall or other structure. The mounting plate or flange 68 may present a planar surface generally perpendicular to the longitudinal axis 13 of the valve body 12 for mounting the sillcock 10 to a surface. It should be understood that the valve body 12 may not include a mounting plate or flange, presenting a back surface of the valve body 12 as indicated by reference numeral 69. The inlets 14 and 16 each include a longitudinal axis 15, which may be directed in any direction in a plane generally parallel to a mounting surface of the mounting plate 68 of the sillcock 10, and spaced between the mounting surface and the valve shut-off 20.

Figure 1:
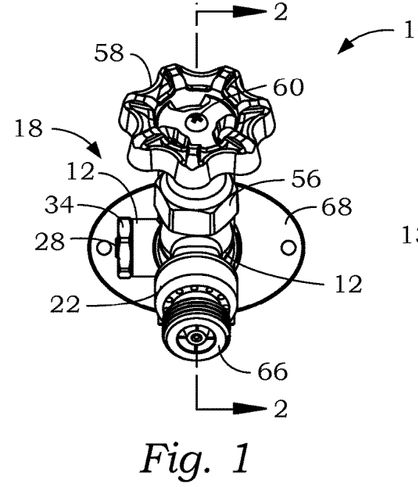
Figure 2:
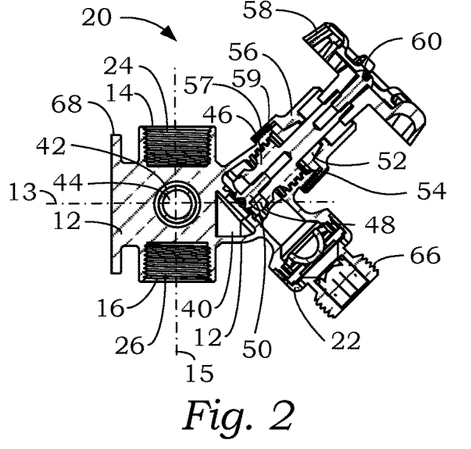
Figure 3A:
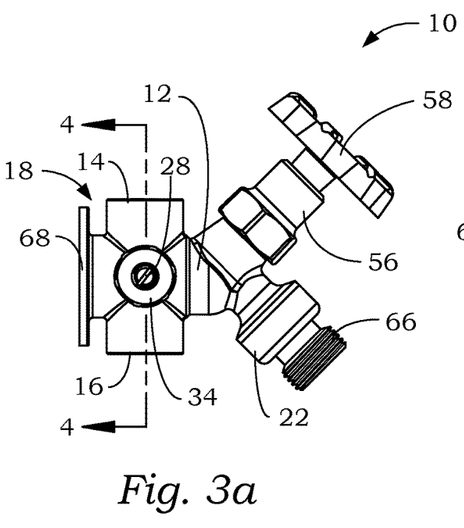
Figure 3B:
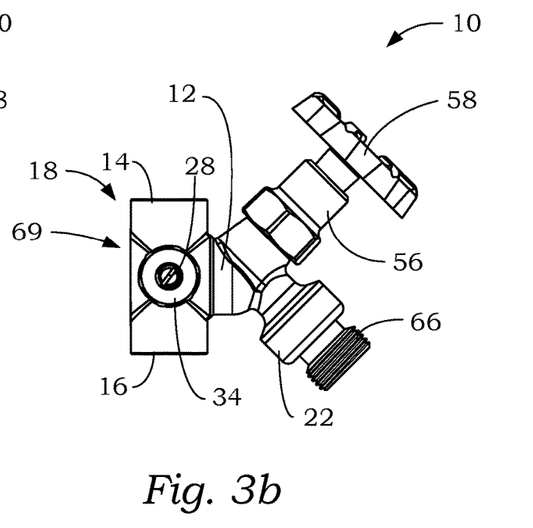
Figures 4, 5, 6, 7:
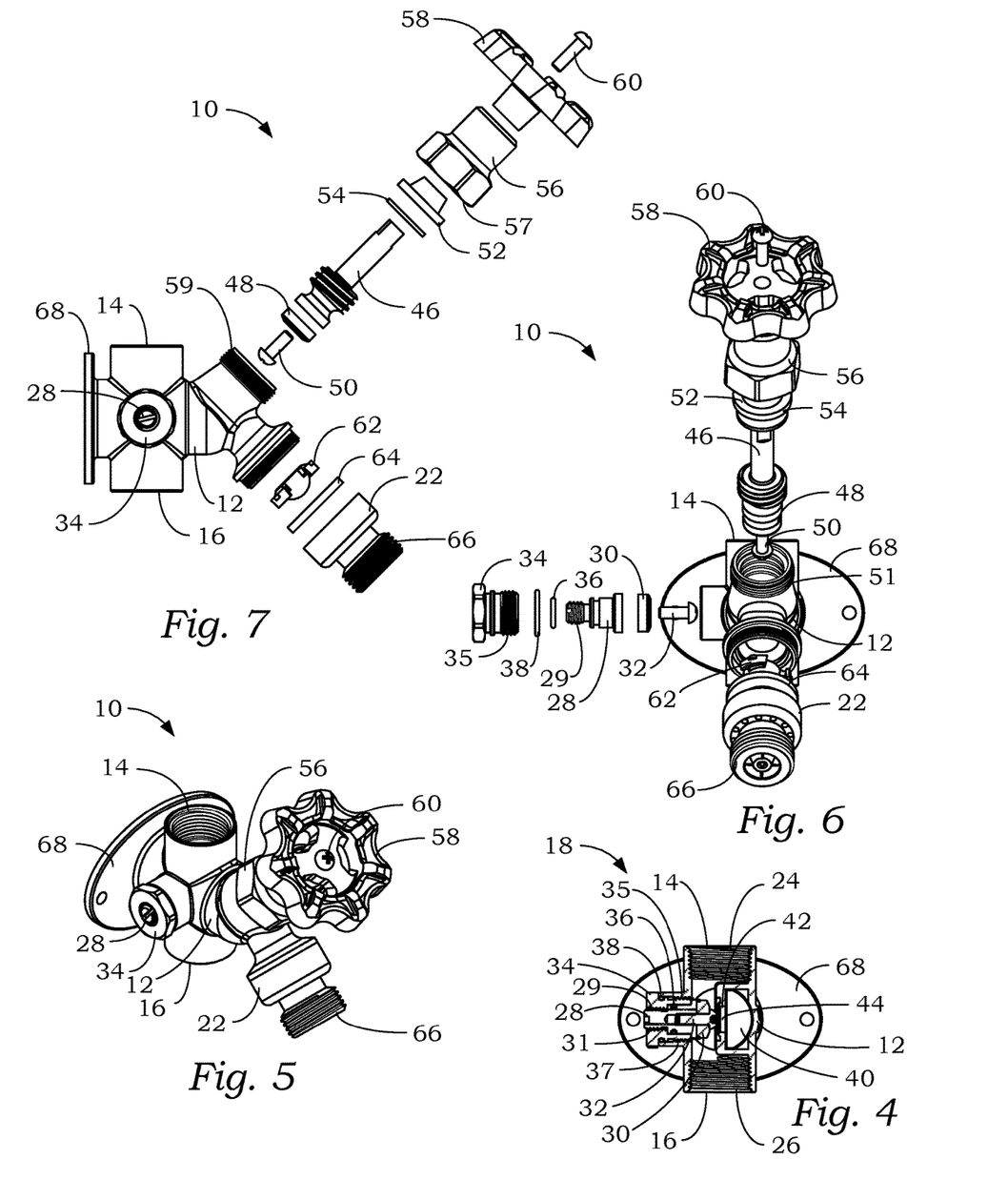
Figure 8:
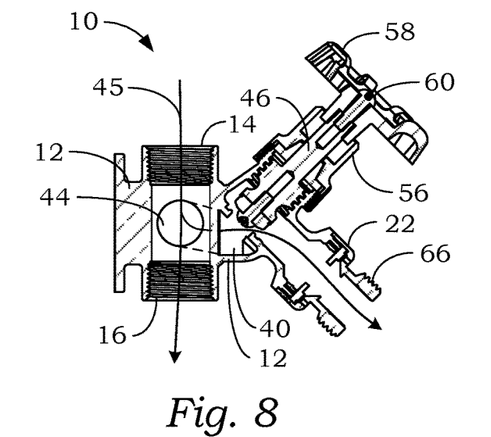
Figure 9:
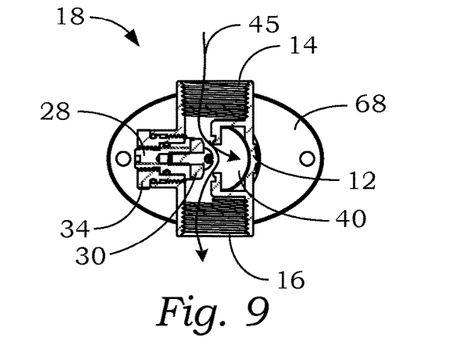
Figure 10:
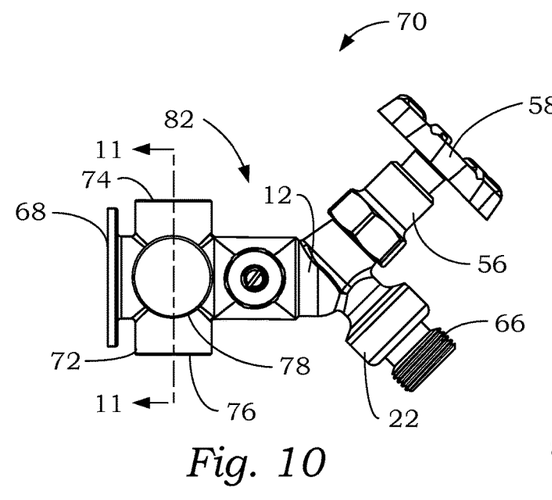
Figure 11:
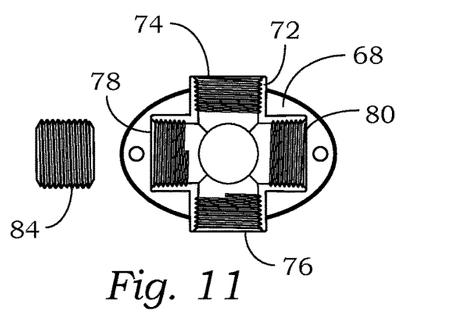
Figures 12, 13:
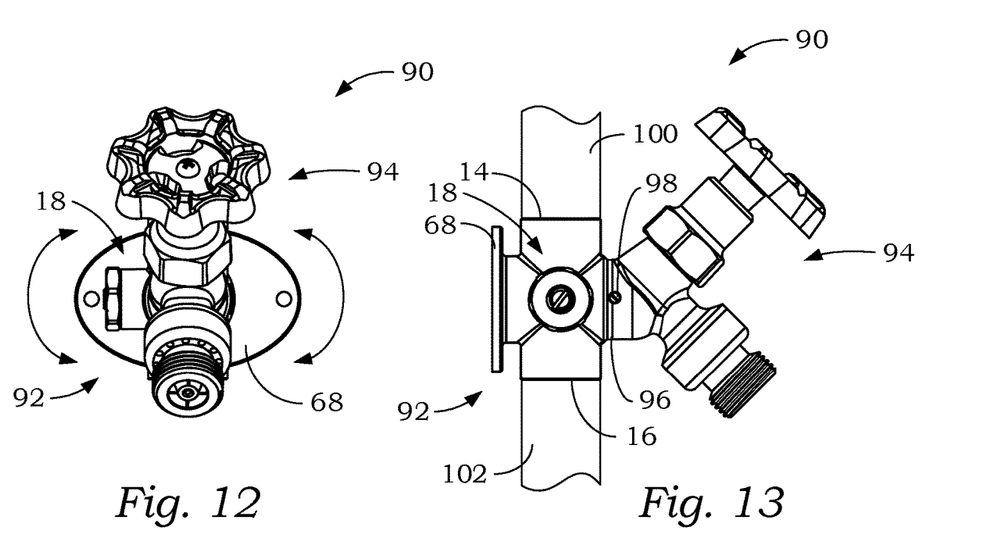
Figure 14:
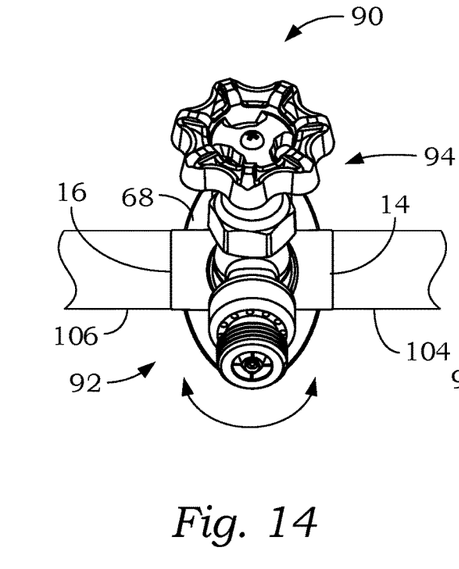
Figure 15:
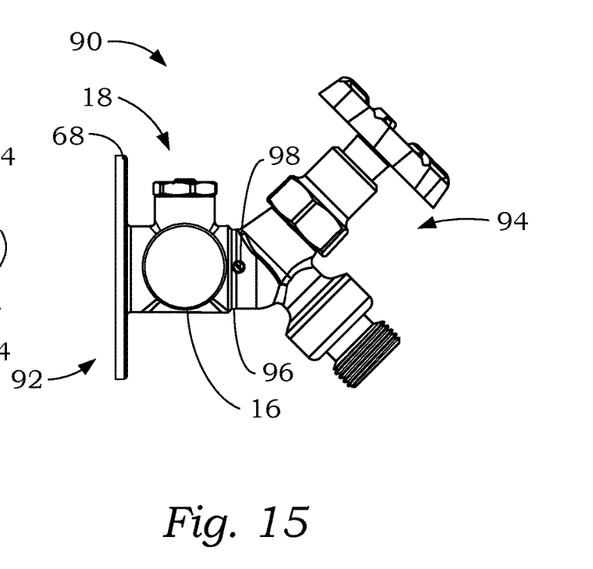

Referring to FIGS. 10 and 11, another embodiment of a sillcock of the present invention is generally indicated by reference numeral 70. The sillcock 70 includes the same parts as described above for sillcock 10 with the base 72 having four inlets 74, 76, 78 and 80. The integral stop 82 is located forward of the four inlets. A threaded plug 84 may be inserted into any inlet that is not being used for a particular installation. Sillcock 70 allows additional flexibility in routing water pipes vertically and horizontally as desired, securely fastened to a wall or other structure without having to cobble together mounting struts and clamps. Additionally, sillcock 70 may be installed without elbow or tee fittings, saving time and money, and reducing maintenance.

Referring to FIGS. 12-15, another embodiment of a sillcock of the present invention is generally indicated by reference numeral 90. Sillcock 90 includes many of the same parts described above for sillcock 10. Sillcock 90 includes a two-part body, base 92 and valve 94 rotatably joined together about a sealed joint 96. The base 92 includes inlets 14 and 16, mounting plate 68, and integral stop 18. The base 92 may be rotated in either direction relative to the valve 94 about the sealed joint 96. A set screw 98 or other fastener may be employed to secure the valve 94 and base 92 together at a desired position. Sillcock 90 allows additional flexibility in installation using a single sillcock. For example, a sillcock 90 of the present invention having one inlet may be mounted with the inlet directed upwardly, downwardly, to the left or to the right. Similarly, a sillcock 90 with two coaxial inlets may be mounted with the inlets positioned vertically to connect to water lines 100 and 102, or horizontally to connect to water lines 104 and 106.

Figure 16:
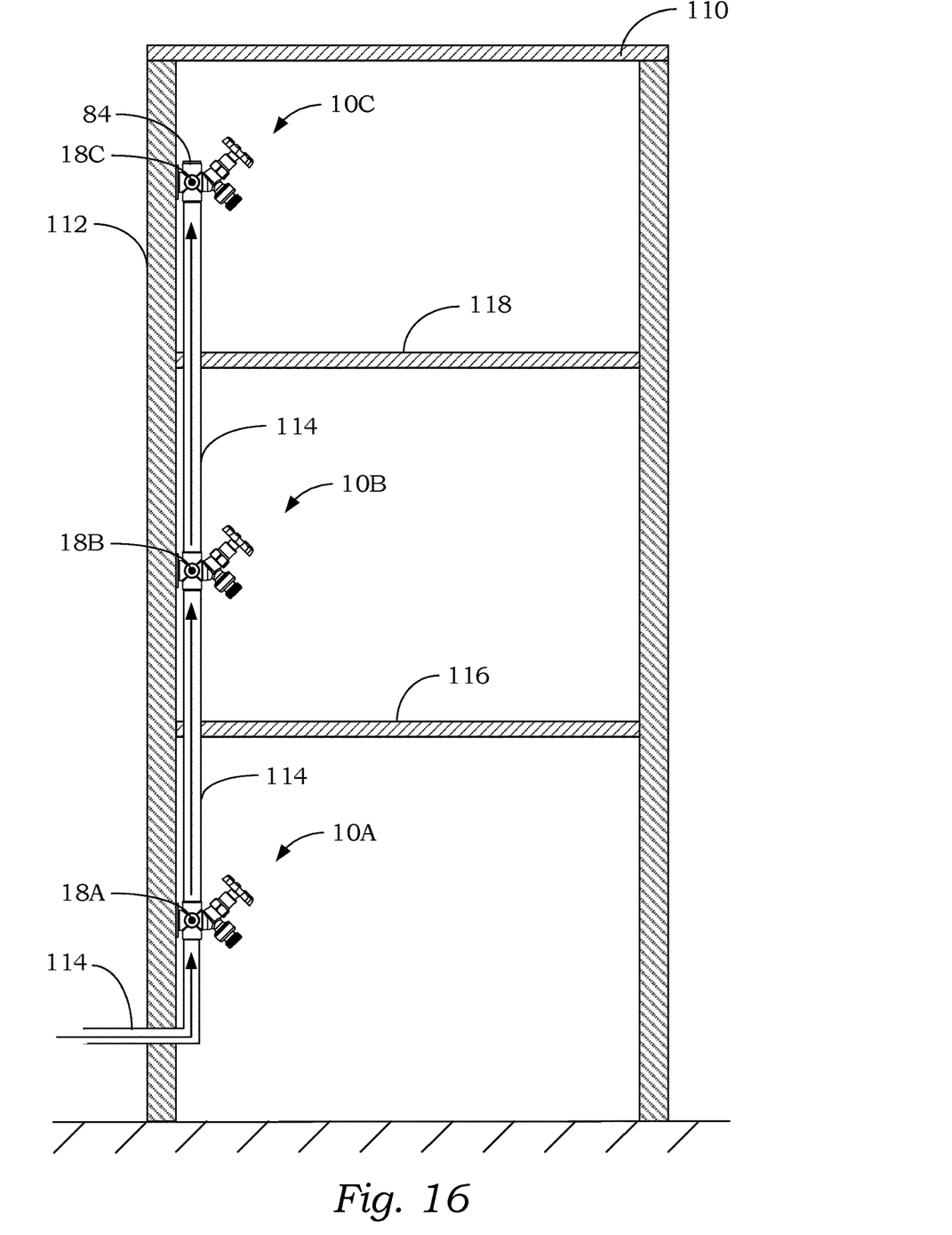

Referring to FIG. 16, a structure 110 is illustrated with three floors. Three sillcocks 10A, 10B and 10C of the present invention are illustrated mounted to a wall 112. The three sillcocks 10A, 10B and 10C are connected to a common water line 114, which enters at the lowest level and proceeds upwardly along the wall 112 and through the floors 116 and 118 connecting each of the sillcocks 10A, 10B and 10C. The water line 114 is connected to both the bottom and top inlets of sillcocks 10A and 10B and to the bottom inlet of sillcock 10C. A threaded plug 84 is installed in the top inlet of sillcock 10C. If any of the sillcocks 10A, 10B or 10C require servicing, such as to replace the packing or a washer, it is only necessary to close the integral stop 18A, 18B or 18C for that individual sillcock with the other sillcocks remaining usable and in service. Further, when the repaired sillcock is to be placed back in service, it is only necessary to open the integral stop 18A, 18B or 18C for that particular sillcock. Each sillcock 10A, 10B and 10C may be serviced independently without a service technician having to locate a water supply shutoff; turn off the water supply to the structure; carry his/her tools to the sillcock to be serviced; service the sillcock; carry tools back to water supply shutoff; turn the water back on for the structure; go back to the serviced sillcock to check for leaks; and then bleed the system of trapped air.

Figure 17:
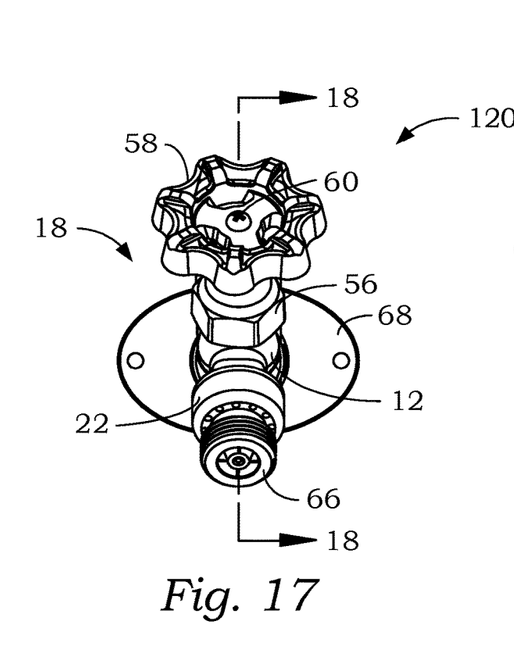
Figure 18:
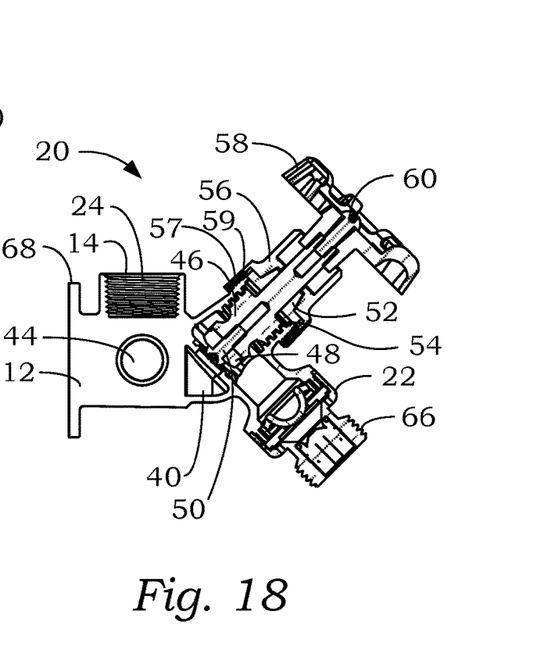

Referring to FIGS. 17-18, a sillcock of the present invention is generally indicated by reference numeral 120. Sillcock 120 includes a body 12 with one inlet 14, and a valve shut-off 20 with an outlet 22. The inlet 14 may include internal pipe threads 24 to receive one end of externally threaded water pipe. Although illustrated with pipe threads, inlet 14 include any other type of joint such as straight threads, solder or push-fit, for example. While shown extending from the top of the sillcock 120, inlet 14 includes a longitudinal axis, which may be directed in any direction in a plane generally parallel to a mounting surface of the mounting plate 68 of the sillcock 120, spaced between the mounting surface and the valve shut-off 20. The sillcock 120 may include two or more inlets as described hereinabove. The other features of the valve shut-off 20 are as described in detail hereinabove.

In a typical installation, the sillcock of the present invention is mounted directly to a wall of a structure, fully supported and secured flush against the wall. No additional mounting fixtures, supports or brackets are needed for the installation. Likewise, because the one or more inlets are on the side of the sillcock of the present invention, the waterlines are coupled directly to the sillcock without use of elbows or tees. The flexibility of the novel sillcock of the present invention permits installation without the need for additional parts, brackets or fixtures for each sillcock installation. The sillcock of the present invention eliminates the cost and inconvenience of installing a sillcock with a rear-entry inlet. The flexibility of the sillcock of the present invention, whether having fixed inlets or rotatable inlets, simplifies installation and improves the security and safety of the overall water system. Further, the ability to shutoff individual sillcocks reduces maintenance costs of the system, and increases the availability of the system when a sillcock is being serviced.

It is to be understood that while certain now preferred forms of this invention have been illustrated and described, it is not limited thereto except insofar as such limitations are included in the following claims. Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

Having thus described the invention, what is claimed as new and desired to be secured by Letters Patent is as follows:

1. A sillcock for use in an exposed water system comprising:
    a body having a first inlet, an integral stop operable between an open position and a closed position, and a back surface;
    a valve shut-off having an open position, a closed position, and an outlet, said valve shut-off coupled to said body; and
    a channel connecting said first inlet and said valve shut-off;
    whereas said first inlet is spaced between said back surface and said valve shut-off;
    whereas said first inlet is in fluidic communication with said outlet when said valve shut-off is in said open position, and said integral stop is in said open position;
    whereas said integral stop isolates said valve shut-off from the water system when in said closed position.

2. The sillcock of claim 1, wherein said first inlet includes a longitudinal axis generally parallel to a plane of said back surface.

3. The sillcock of claim 1, wherein said body includes a longitudinal axis generally perpendicular to said back surface.

4. The sillcock of claim 1, wherein said back surface includes a mounting flange.

5. The sillcock of claim 1 wherein said valve shut-off is rotationally coupled to said body.

6. The sillcock of claim 1, further comprising a second inlet in fluidic communication with said first inlet.

7. The sillcock of claim 6, wherein said second inlet includes a longitudinal axis generally parallel to a plane of said back surface.

8. The sillcock of claim 6, further comprising a third inlet in fluidic communication with said first and second inlets.

9. The sillcock of claim 8, further comprising a fourth inlet in fluidic communication with said first, second and third inlets.

10. The sillcock of claim 8, wherein said third inlet includes a longitudinal axis generally parallel to a plane of said back surface.

11. The sillcock of claim 10, wherein said fourth inlet includes a longitudinal axis generally parallel to a plane of said back surface.

12. A sillcock for use with an exposed water system comprising:
    a planar mounting surface,
    a body having a first inlet and an integral stop, said body coupled to said planar mounting surface;
    a valve shut-off operable to move a valve between an open and a closed position, and having an outlet, said valve shut-off coupled to said body; and
    a channel connecting said first inlet to said valve shut-off;
    said integral stop operable between an open position and a closed position;
    wherein said integral stop blocks said channel when in said closed position isolating said valve shut-off from the water system;
    wherein said first inlet is in fluidic communication with said valve shut-off when said integral stop is in said open position;
    wherein said first inlet is in fluidic communication with said outlet when said integral stop is in said open position and said valve shut-off is in said open position.

13. The sillcock of claim 12 wherein said valve shut-off is rotationally coupled to said body.

14. The sillcock of claim 12 wherein said first inlet is disposed between said planar mounting surface and said valve shut-off.

15. The sillcock of claim 14 wherein said body includes a second inlet.

16. The sillcock of claim 15, wherein said first inlet and said second inlet each include a longitudinal axis in a plane generally parallel to a plane of said planar mounting surface.

17. The sillcock of claim 15, wherein said first inlet and said second inlet include coplanar longitudinal axes.

18. The sillcock of claim 17, wherein said first inlet and said second inlet are oriented at a 90-degree angle.

19. The sillcock of claim 17, wherein said first inlet and said second inlet are oriented at a 180-degree angle.

20. The sillcock of claim 17, further comprising a third inlet in fluidic communication with said first and second inlets.

21. The sillcock of claim 20, wherein said third inlet includes a longitudinal axis coplanar with said longitudinal axes of said first inlet and said second inlet.

22. The sillcock of claim 21, further comprising a fourth inlet in fluidic communication with said first, second and third inlets.

23. The sillcock of claim 22, wherein said fourth inlet includes a longitudinal axis coplanar with said longitudinal axes of said first inlet, said second inlet, and said third inlet.

24. A sillcock for use with an exposed water system comprising:
    a mount,
    a body having a first inlet and an integral stop, said body coupled to said mount;
    a valve shut-off having a handle operable to move said valve shut-off between an open and a closed position, and an outlet, said valve shut-off coupled to said body; and
    a channel connecting said first inlet to said valve shut-off;

said integral stop operable between an open position and a closed position;

wherein said integral stop prevents water from entering said channel when in said closed position isolating said valve shut-off from the water system;

wherein said first inlet is in fluidic communication with said valve shut-off when said integral stop is in said open position;

wherein said first inlet is in fluidic communication with said outlet when said valve shut-off when said integral stop is in said open position and said valve shut-off is in said open position;

wherein said first inlet includes a longitudinal axis generally parallel to a plane of said mount.

25. The sillcock of claim 24 wherein said first inlet is spaced between said mount and said valve shut-off.

26. The sillcock of claim 24 wherein said valve is rotationally coupled to said body.

27. The sillcock of claim 24 wherein said body includes a second inlet in fluidic communication with said first inlet.

28. The sillcock of claim 27 wherein said first inlet and said second inlet include coplanar longitudinal axes.

29. The sillcock of claim 28, wherein said first inlet and said second inlet are oriented at a 90-degree angle.

30. The sillcock of claim 28, wherein said first inlet and said second inlet are oriented at a 180-degree angle.

31. The sillcock of claim 28, further comprising a third inlet in fluidic communication with said first and second inlets.

32. The sillcock of claim 31, wherein said third inlet includes a longitudinal axis coplanar with said longitudinal axes of said first inlet and said second inlet.

33. The sillcock of claim 32, further comprising a fourth inlet in fluidic communication with said first, second and third inlets.

34. The sillcock of claim 33, wherein said fourth inlet includes a longitudinal axis coplanar with said longitudinal axes of said first inlet, said second inlet, and said third inlet.

* * * * *